(12) United States Patent
Hirano et al.

(10) Patent No.: US 8,351,783 B2
(45) Date of Patent: Jan. 8, 2013

(54) APPARATUS AND METHOD FOR MEASURING CHROMATIC DISPERSION

(75) Inventors: Masaaki Hirano, Yokohama (JP); Toshiki Taru, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 416 days.

(21) Appl. No.: 12/646,702

(22) Filed: Dec. 23, 2009

(65) Prior Publication Data

US 2010/0209101 A1  Aug. 19, 2010

(30) Foreign Application Priority Data

Dec. 25, 2008  (JP) ................. 2008-331237

(51) Int. Cl.
*H04B 10/08* (2006.01)

(52) U.S. Cl. ............ 398/29; 398/81; 398/147; 398/159; 359/337.5

(58) Field of Classification Search .................... 398/29, 398/81, 147, 159, 148; 359/337.5
See application file for complete search history.

(56) References Cited

U.S. PATENT DOCUMENTS

| | | | |
|---|---|---|---|
| 5,956,131 A | 9/1999 | Mamyshev et al. | |
| 7,146,085 B2 * | 12/2006 | Tadakuma et al. | ............ 385/122 |
| 2007/0035722 A1 | 2/2007 | Tadakuma et al. | |
| 2009/0079967 A1 | 3/2009 | Radic | |
| 2010/0209101 A1 | 8/2010 | Hirano et al. | |

OTHER PUBLICATIONS

Leonard G. Cohen, "A Universal Fiber-Optic (UFO) Measurement System Based on a Near-IR Fiber Raman Laser," IEEE Journal of Quantum Electronics, vol. QE-14, No. 11, Nov. 1978, pp. 855-859.

Bruno Costa et al., "Phase Shift Technique for the Measurement of Chromatic Dispersion in Optical Fibers Using LED's," IEEE Journal of Quantum Electronics, 1982, vol. QE-18, No. 10, pp. 1509-1515.

K. Naganuma, "Dispersion Measurement Technique-Application to Semiconductor Laser Cavities," NTT Opto-electronics Laboratories, 1993, vol. 42, No. 8, pp. 1049-1058.

T. Hasegawa et al., "High nonlinearity Bismuth fibers and their applications," OFC2006, paper OTuH5.

L.F. Mollenauer et al., "Method for facile and accurate measurement of optical fiver dispersion maps," Optics Letters, vol. 21, No. 21, Nov. 1996, pp. 1724-1726.

A. Mussot et al., "Zero-Dispersion Wavelength Mapping in Short Single-Mode Optical Fibers Using Parametric Amplification," IEEE Photonics Technology Letters, vol. 18, No. 1, 2006, pp. 22-24.

(Continued)

*Primary Examiner* — M. R. Sedighian
(74) *Attorney, Agent, or Firm* — McDermott Will & Emery LLP (57) ABSTRACT

The chromatic dispersion of an optical component is measured with high accuracy using a simple set-up, which includes a pump light source, a probe light source, and a measuring means. Pump light having a wavelength $\lambda_{pump}$ and probe light having a wavelength $\lambda_{probe}$ is propagated through an optical component, with the wavelength $\lambda_{probe}$ being apart from the wavelength $\lambda_{pump}$ by a given frequency. The generation efficiency of the idler light with respect to the wavelength $\lambda_{pump}$ is calculated by measuring the power of idler light having a wavelength $\lambda_{idler}$ output from the optical component, and by seeking the pump light wavelength for making the generation efficiency a local extreme value, the chromatic dispersion of the optical component is calculated from the result of calculation of phase mismatch among the pump light wavelength having such wavelength as sought, the corresponding probe light wavelength, and the corresponding the idler light wavelength.

8 Claims, 10 Drawing Sheets

OTHER PUBLICATIONS

E. Myslivets et al., "High Resolution Measurement of Nearly Dispersionless Fiber by Localized Four Photon Mixing," Proc. OFC/NFOEC 2008, PDP11.

B. Auguie et al., "Ultralow Chromatic Dispersion Measurement of Optical Fibers With a Tunable Fiber Laser," IEEE Photonics Technology Letters, vol. 18, No. 17, 2006, pp. 1825-1827.

K. Naganuma, "Measurements of Wavelength Dispersion and Utrashort Light Pulse-Form Using Interferometric Correlation Techniques," Laser Study, vol. 23, No. 11, 1995, pp. 55-56.

US Office Action issued in U.S. Appl. No. 12/647,267 issued May 24, 2012.

* cited by examiner

APPARATUS AND METHOD FOR MEASURING CHROMATIC DISPERSION

BACKGROUND OF THE INVENTION

1. Field of the Invention

The present invention relates to apparatus and methods for measuring chromatic dispersion.

2. Description of the Background Arts

It is known that the chromatic dispersion of an optical component causes broadening of an incident signal light pulse. Various methods have been examined for precisely measuring chromatic dispersions of optical components in order to evaluate them. Examples of methods for measuring chromatic dispersions of optical components include a time-of-flight method (L. G. Cohen and C. Lin: IEEE J. Quantum Electron. QE-14 (1978) No. 11, p. 855), a modulated signal phase shift method (B. Costa, et al.: IEEE J. Quantum Electron. QE-18 (1982) No. 10, p. 1509), and an interference method (Kazunori Naganuma: NTT R&D vol. 42 (1993) p. 1049). Moreover, a method of measuring the chromatic dispersion by means of four-wave mixing (FWM) is also studied (T. Hasegawa, et al.: OFC2006, paper OTuH5, 2006).

In recent years, much attention has been paid to researches on processing optical signals using FWM that occurs in a highly nonlinear fiber, and various applications are proposed. The highly nonlinear fiber is a fiber in which the efficiency of generating nonlinear phenomenon is enhanced, and in many cases, it is used as a device in which FWM is applied in a length having tens of meters to hundreds of meters.

In such applications, not only the chromatic dispersion (second-order dispersion) but also the higher-order dispersions including dispersion slope and the wavelength dependence of the dispersion slope are important parameters. It is desired that these parameters be considered in the performance evaluation of the highly nonlinear fiber. However, according to the above-mentioned methods of measuring the chromatic dispersion, it has been difficult to achieve a highly precise measurement with respect to the chromatic dispersions of optical components having a length of tens of meters to hundreds of meters. Further problem of such methods is that precisely measuring the chromatic dispersion requires a high-precision phase modulator and a light source having an extremely high degree of wavelength accuracy, for example, and hence a complicated structure.

SUMMARY OF THE INVENTION

The object of the present invention is to provide apparatus having a simple measurement set-up, as well as measuring methods, with which chromatic dispersion of a device under test that is an optical component can be measured with high accuracy.

To achieve the object, a chromatic dispersion measuring apparatus is provided. The chromatic dispersion measuring apparatus comprises: a pump light source for emitting pump light with a wavelength $\lambda_{pump}$; a probe light source for emitting probe light with a wavelength $\lambda_{probe}$; a measuring means for measuring the power of idler light having a wavelength $\lambda_{idler}$ that is output from a device under test according to four-wave mixing generated by propagation of the pump light and the probe light through the device; and an analysis tool for calculating the chromatic dispersion of the device by detecting a pump light wavelength with which the generation efficiency of the idler light becomes a local extreme value in the relationship between the pump light wavelength and the generation efficiency of the idler light when the pump light and the probe light are propagated under the condition where the wavelength difference or the frequency difference between the pump light and the probe light is kept substantially constant, and then by calculating phase mismatch among such detected pump light wavelength, the corresponding probe light wavelength, and the corresponding idler light wavelength.

As another embodiment of the invention, a chromatic dispersion measuring method for calculating the chromatic dispersion of a device under test is provided. The chromatic dispersion measuring method comprises: propagating pump light having a wavelength $\lambda_{pump}$ and probe light having a wavelength $\lambda_{probe}$ through a device under test, the wavelength $\lambda_{probe}$ being apart from the wavelength $\lambda_{pump}$ by a given wavelength or a given frequency; seeking the generation efficiency of the idler light with respect to the wavelength $\lambda_{pump}$ by measuring the power of idler light having a wavelength $\lambda_{idler}$ that is output from the device according to four-wave mixing generated in the device; seeking the pump light wavelength with which the generation efficiency of the idler light becomes a local extreme value in the relationship between the generation efficiency and the wavelength $\lambda_{pump}$; and calculating the chromatic dispersion of the device from the result of calculation of phase mismatch among the pump light wavelength having such wavelength, the corresponding probe light wavelength, and the corresponding idler light wavelength.

According to the chromatic dispersion measuring apparatus of the present invention and the chromatic dispersion measuring method of the present invention, the chromatic dispersion of a device under test, that is an optical component, can be measured with high precision, without performing a numerical simulation, using a simple measurement set-up in which neither special equipment such as a streak camera or a modulator, nor mechanism for a delay-time generation and reference light path is required.

BRIEF DESCRIPTION OF THE DRAWING

FIGS. 6A and 6B are graphs showing the wavelength dependence of the dispersion slope of Optical fiber A: FIG. 6A shows the whole, and FIG. 6B shows an enlarged part.

DETAILED DESCRIPTION OF THE INVENTION

The above-mentioned features and other features, aspects, and advantages of the present invention will be better understood through the following description, appended claims, and accompanying drawings. In the explanation of the drawings, an identical mark is applied to identical elements and an overlapping explanation will be omitted.

Chromatic Dispersion Measuring Apparatus

Figure 1:
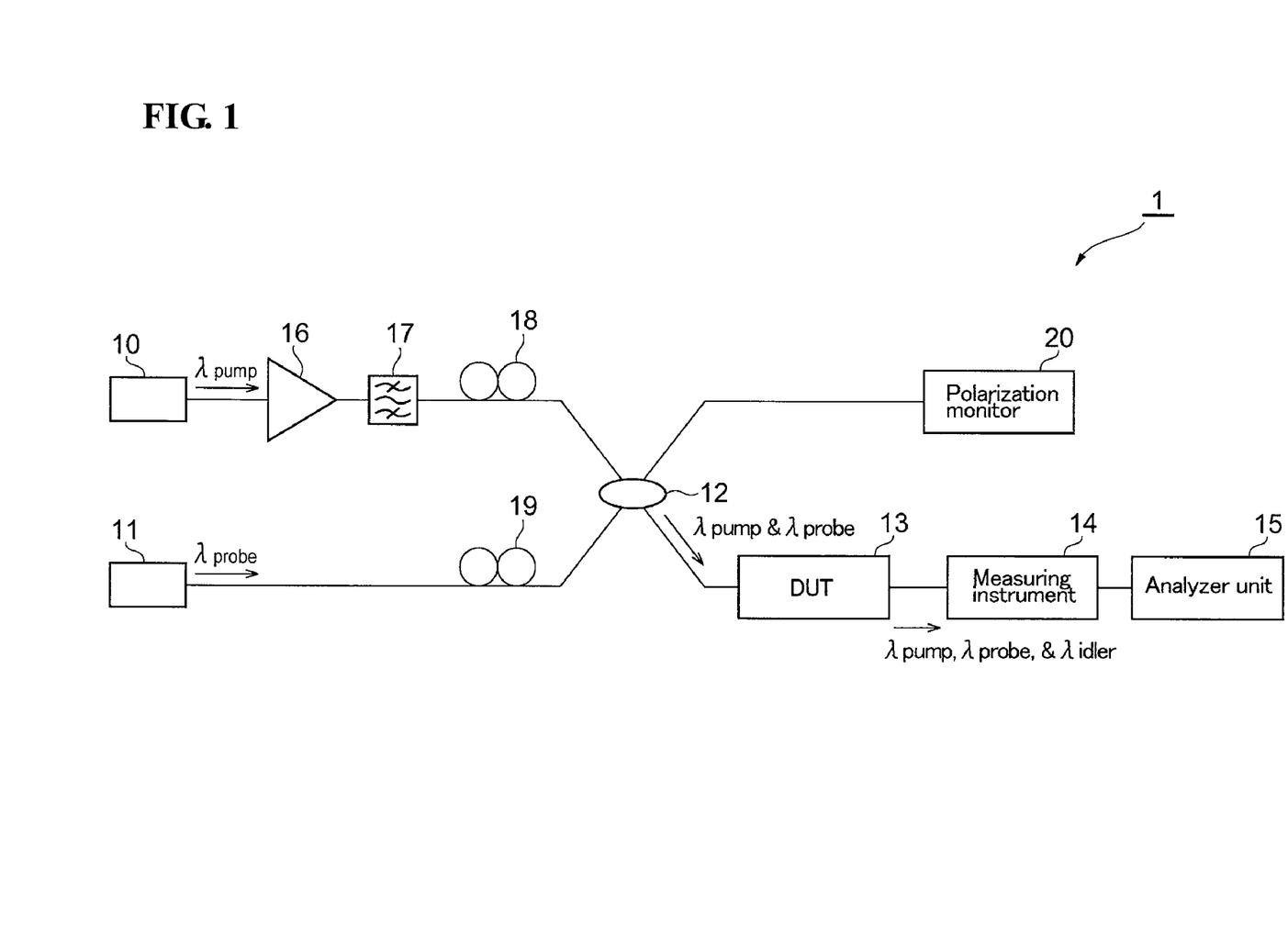
FIG. 1 is a conceptional schematic diagram of a chromatic dispersion measuring apparatus relating to an embodiment of the present invention.

FIG. 1 is a conceptional schematic diagram of a chromatic dispersion measuring apparatus 1 relating to an embodiment of the present invention. The chromatic dispersion measuring apparatus 1 comprises a pump light source 10, a probe light source 11, an optical coupler 12, a device under test (DUT) 13, a measuring instrument 14, an analyzer unit 15, an optical amplifier 16, a bandpass filter 17, polarization controllers 18 and 19, and a polarization monitor 20.

The pump light source 10 is a light source for outputting pump light with a wavelength $\lambda_{pump}$: a wavelength tunable light source capable of tunably outputting a single wavelength, or a wideband light source is suitably used therefor. The wavelength $\lambda_{pump}$ of the pump light that is incident on the DUT 13 is set to be different from the wavelength $\lambda_{probe}$ of the below-mentioned probe light. Also, it is preferable that the intensity of the pump light incident on the DUT 13 be sufficiently high to the extent that little nonlinear phenomenon other than FWM will occur, and the intensity will be set in the range of 10 mW to several W, for example.

The probe light source 11 is a light source for outputting probe light with a wavelength $\lambda_{probe}$, and a wideband light source or a wavelength tunable light source capable of tunably outputting a single wavelength is suitably used therefor. The wavelength of the probe light should be designed not to include the wavelength $\lambda_{pump}$ of the pump light at a time when the probe light is incident on the DUT 13. It is preferable that the intensity of the probe light incident on the DUT 13 be sufficiently high to the extent that little nonlinear phenomenon other than FWM will occur; however, it may be not so high as the intensity of the pump light. More specifically, the incident light intensity of the probe light is in the range of about 0.1 mW to several W.

When the probe light is made incident on the DUT 13, one or both of the pump light and the probe light consist of substantially a single wavelength. In such case, the probe light is preferably such that the ratio of the half width at half maximum is 0.5% or less relative to the central wavelength, for example, and the smaller this ratio, the better. The idler light having a wavelength $\lambda_{idler}$ is generated according to the four-wave mixing, i.e., a nonlinear optical phenomenon, which occurs in the DUT 13 as a result of the propagation of the pump light and the probe light.

Each of the following means is provided on the optical path of the pump light and the probe light so that they may be incident on the DUT 13. An amplifier 16 has a function to emit amplified light by amplifying the pump light that has been input thereinto from the pump light source 10. For the purpose of the amplifier 16, a Raman amplifier, an optical semiconductor amplifier (OSA), and a rare-earth ion doped optical amplifier (an erbium doped fiber amplifier (EDFA), a thulium doped fiber amplifier (TDFA), etc.) are preferably used. Here, the amplifier 16 is unnecessary in the case where the light intensity of the pump light output from the pump light source 10 is sufficiently high: more specifically, it will be sufficient if there is an output of several W to tens of mW.

The bandpass filter 17 has a function of allowing only the light having a frequency of necessary range to pass out of the pump light that has been output from the amplifier 16, and to attenuate the other light having a frequency of unnecessary range. It is preferable to provide the bandpass filter 17 when the optical noise from amplifier 16 is so significant as to make the detection of idler light difficult; however, it is not indispensable.

The polarization controllers 18 and 19 are provided for the purpose of arranging the status of polarization of the pump light and the probe light so as to coincide with each other. More specifically, the polarization controller 18 outputs the pump light to the optical coupler 12 after adjusting the polarization state of incident pump light. Also, the polarization controller 19 outputs the probe light to the optical coupler 12 after adjusting the polarization state of incident probe light. The polarization controllers 18 and 19 are not indispensable; however, it is preferable to provide them because the output power of the idler light becomes stronger when the states of polarization of the pump light and the probe light are arranged to coincide with each other. It is unnecessary to provide the polarization controllers 18 and 19 in the case where either one or both of the states of polarization of the probe light and the pump light are scrambled to make the states of polarization random.

The optical coupler 12 is provided to combine the pump light and the probe light so as to make them incident on the DUT 13 at the same time. The pump light and the probe light may be made incident on the DUT 13 using a spatial optical system such as lens or the like instead of using the optical coupler 12. If necessary, the polarization monitor 20 is provided downstream of the optical coupler 12 in an arm different from the DUT 13 so as to confirm whether the states of polarization of the pump light and the probe light are coincident.

The measuring instrument 14 is a measuring means for measuring the output power of the idler light that is output from the DUT 13 according to four-wave mixing generated by propagation of the pump light and the probe light through the DUT 13. More specifically, the measuring instrument 14 is constituted by an optical spectrum analyzer (OSA), or a combination of a monochromator for picking up only the idler light wavelength that is the measurement target, and a photodetector such as an optical calorimeter. Also, the measuring instrument 14 may have a function of calculating the incident light intensities of the pump light and the probe light that are incident on the DUT 13 by simultaneously monitoring the output light intensities of the pump light and the probe light that are output therefrom.

The analyzer unit 15 is an analysis tool for calculating the chromatic dispersion of the DUT 13 according to the output intensities of idler light as measured by the measuring instrument 14. The manner of calculating the chromatic dispersion by the analysis tool will be described later.

The Method of Measuring the Chromatic Dispersion

An n-th order derivative of the mode-propagation constant 6 in the DUT 13 is written as Equation (1):

$$\beta_n = d^n\beta/d\omega^n \qquad (1).$$

The second order dispersion ($\beta_2$) is calculated by making "n=2" in Equation (1). Also, the chromatic dispersion (Disp), dispersion slope (Slope), wavelength dependence (dS/dλ) of the dispersion slope, which are used in the optical communication, are calculated by Equations (2), (3), and (4), respectively:

$$\text{Disp} = d(\beta_1)/d\lambda \quad (2),$$

$$\text{Slope} = d^2(\beta_1)/d\lambda^2 \quad (3), \text{ and}$$

$$dS/d\lambda = d^3(\beta_1)/d\lambda^3 \quad (4).$$

In Equations (2), (3), and (4), $\lambda$ is a wavelength, and has the relationship shown by Equation (5) with respect to angular frequency $\omega$:

$$\omega = 2\pi C/\lambda \quad (5),$$

where C represents a speed of light in the vacuum.

Here, the frequency $\omega_{idler}$ of the idler light that occurs according to degenerate four-wave mixing, which is a kind of nonlinear optical phenomenon, satisfies the relation to the frequency $\omega_{pump}$ of the pump light and the frequency $\omega_{probe}$ of the probe light expressed by Equation (6):

$$2\omega_{pump} - \omega_{probe} - \omega_{idler} = 0 \quad (6).$$

Also, the generation efficiency of the idler light, that is, $$\frac{P_{idler}}{P_{probe} P_{idler}^2},$$

(wherein $P_{idler}$ is a power of the idler light output from the DUT 13, $P_{probe}$ is a power of the probe light incident to the DUT 13, and $P_{pump}$ is a power of the pump light incident to the DUT 13) can be written as Equation (7):

$$\frac{P_{idler}}{P_{probe} P_{pump}^2} = (\gamma \cdot \text{Leff})^2 \exp(-\alpha_{linear} \cdot L) \cdot \eta, \quad (7)$$

wherein, $\gamma$ is a nonlinear coefficient of the DUT 13, Leff is an effective length of the DUT 13, $\alpha_{linear}$ is a linear transmission loss of the DUT 13, L is a length of the DUT 13, and $\eta$ is a phase matching parameter.

Here, the nonlinear coefficient $\gamma$ is calculated by the formula (8):

$$\gamma = \frac{2\pi}{\lambda} \cdot \frac{n_2}{A\text{eff}}, \quad (8)$$

where $n_2$ represents a third order nonlinear refractive index, and Aeff represents an effective area. Also, the effective length Leff is calculated by a formula (9):

$$\text{Leff} = \frac{1 - \exp(-\alpha_{linear} L)}{\alpha_{linear}}. \quad (9)$$

The linear transmission loss $\alpha_{linear}$ satisfies the relationship $\alpha_{linear} = \alpha/4.343$ with respect to the transmission loss $\alpha$ as indicated in terms of dB.

Assuming that there is no wavelength dependence of nonlinear coefficient $\gamma$ and linear transmission loss $\alpha_{linear}$, the parameters $\gamma$, $\alpha_{linear}$, Leff, L, and $P_{pump}$, which are included in Equation (7), are values determined by the characteristics of the DUT 13 and the experiment conditions and can be treated as coefficients. On the other hand, the phase matching parameter $\eta$ can be written as Equation (10):

$$\eta = \frac{1}{\alpha_{linear}^2 + \Delta\beta^2} \left( \alpha_{linear}^2 + \frac{4\exp(-\alpha_{linear} \cdot L) \cdot \sin^2(\Delta\beta L/2)}{\text{Leff}^2} \right), \quad (10)$$

wherein $\Delta\beta = 2 \times \beta(\omega_{pump}) - \beta(\omega_{probe}) - \beta(\omega_{idler})$, and $\beta(\omega_{pump})$, $\beta(\omega_{probe})$, and $\beta(\omega_{idler})$ represent propagation constant in pump light frequency, probe light frequency, and idler light frequency respectively. Under the condition of phase matching ($\Delta\beta = 0$), the phase matching parameter $\eta$ has a peak value (maximum) $\eta = 1$.

Here, if the DUT 13 is a silica-based optical fiber, for example, $\alpha_{linear}^2$ can be ignored, since it is such a small value as on the order of $10^{-4}$/m. Thus, in this case, Equation (10) can be rewritten with Equation (11):

$$\eta \approx \frac{1}{\Delta\beta^2} \left( \frac{4\exp(-\alpha_{linear} \cdot L) \cdot \sin^2(\Delta\beta L/2)}{\text{Leff}^2} \right)$$

$$= \frac{L^2 \cdot \exp(-\alpha_{linear} \cdot L)}{\text{Leff}^2} \left( \frac{\sin(\Delta\beta L/2)}{\Delta\beta L/2} \right)^2. \quad (11)$$

Therefore, the generation efficiency of the idler light shown by Equation (7) becomes an oscillating function having maximal and minimal values according to $$\left\{ \frac{\sin(\Delta\beta L/2)}{\Delta\beta L/2} \right\}^2.$$

If the Equation (11) is differentiated with respect to X, which is defined as shown by Equation (12):

$$X = \Delta\beta L/2 \quad (12),$$

such differentiation results in Equation (13):

$$\frac{d\eta}{dX} = \frac{2L^2 \cdot \exp(-\alpha_{linear} \cdot L)}{\text{Leff}^2} X^{-3} \{\sin(X)\} \left\{ \begin{array}{l} -\sin(X) + \\ X\cos(X) \end{array} \right\}. \quad (13)$$

When the relation shown in Equation (14):

$$\sin(X) = 0 \quad (14),$$

is satisfied, the phase matching parameter $\eta$ has a minimal value (in the case of $X \neq 0$). When the relation shown in Equation (15):

$$-\sin(X) + X\cos(X) = 0 \quad (15),$$

is satisfied, $\eta$ has a maximal value.

According to Equations (13) and (14), the conditions for having a minimal value are as shown in Equations (16):

$$X = \Delta\beta L/2 = N\pi$$

$$\Delta\beta = 2N\pi/L, N = \ldots -3, -2, -1, +1, +2, +3, \quad (16).$$

Also, according to Equations (13) and (15), the condition for having a maximal value is as shown in Equation (17):

$$-\sin(\Delta\beta L/2) + \Delta\beta L/2 \cos(\Delta\beta L/2) = 0 \quad (17).$$

The $\Delta\beta$ that makes $\eta$ maximal, in the case of having a large value such as "$\Delta\beta L/2 > 10\pi$" (N= ... −7, −6, −5, 5, 6, 7 ...), can be approximated with Equation (18):

$$\Delta\beta \approx (2N+1)\pi/L \tag{18}$$

Here, if a Taylor expansion is made in a neighborhood of the pump light frequency $\omega_{pump}$ and the relationship of Equation (6) is used, the phase mismatch $\Delta\beta$ can be expanded with the following Equation (19):

$$\Delta\beta = -\beta_{2\_p} \cdot (\omega_{probe} - \omega_{pump})^2 - \frac{1}{12}\beta_{4\_p} \cdot (\omega_{probe} - \omega_{pump})^4 - \frac{1}{360}\beta_{6\_p} \cdot (\omega_{probe} - \omega_{pump})^6. \tag{19}$$

In Equation (19), $\beta_{n\_p}$ represents $\beta_n$ at the pump light frequency. Equation (19) can make Equation (20), ignoring fourth-order differential $\beta_4$ and the following higher-order differentials, except for the local extreme value of the generation efficiency of the idler light existing in the vicinity of phase matching where the second-order differential $\beta_2$ is very small and the pump light frequency is close to zero-dispersion frequency:

$$\Delta\beta = -\beta_{2\_p} \cdot (\omega_{probe} - \omega_{pump})^2 \tag{20}$$

Here, if $\beta_{2\_p}$ is subjected to a Taylor expansion to the extent of sixth order in a neighborhood of the zero-dispersion frequency $\omega_z$ where "$\beta_2 = 0$" holds, the $\beta_{2\_p}$ is expressed by Equation (21):

$$\beta_{2\_p} = -\beta_{3\_z} \cdot (\omega_{pump} - \omega_z) + \frac{1}{2}\beta_{4\_z} \cdot (\omega_{pump} - \omega_z)^2 - \frac{1}{6}\beta_{5\_z} \cdot (\omega_{pump} - \omega_z)^3 + \frac{1}{24}\beta_{6\_z} \cdot (\omega_{pump} - \omega_z)^4, \tag{21}$$

where $\beta_{n\_z}$ is $\beta_n$ at the zero-dispersion frequency $\omega_z$. When $\beta_5$ and $\beta_6$ are sufficiently small, by substituting Equation (21) in Equation (19), and using the relations of $\beta_{4\_p} = \beta_{4\_z}$, Equation (22) can be made:

$$\Delta\beta = -\frac{1}{2}\beta_{4\_z}(\omega_{probe} - \omega_{pump})^2 \omega_{pump}^2 - \\
(\beta_{3\_z} - \omega_0\beta_{4\_z})(\omega_{probe} - \omega_{pump})^2 \omega_{pump} - \\
\left(-\omega_0\beta_{3\_z} + \frac{1}{2}\omega_0^2\beta_{4\_z}\right)(\omega_{probe} - \omega_{pump})^2 - \\
\frac{1}{12}\beta_{4\_z}(\omega_{probe} - \omega_{pump})^4. \tag{22}$$

Also, Equation (23) can be made by substituting Equation (21) in Equation (20):

$$\Delta\beta/(\omega_{probe} - \omega_{pump})^2 = \beta_{3\_z} \cdot (\omega_{pump} - \omega_z) + \frac{1}{2}\beta_{4\_z} \cdot (\omega_{pump} - \omega_z)^2 + \frac{1}{6}\beta_{5\_z} \cdot (\omega_{pump} - \omega_z)^3 + \frac{1}{24}\beta_{6\_z} \cdot (\omega_{pump} - \omega_z)^4. \tag{23}$$

Here, X depends only on the pump light frequency in the case where the frequency of the pump light is changed while maintaining the relation such that $\Delta\omega = \omega_{probe} - \omega_{pump}$ (or $\Delta\lambda = \lambda_{probe} - \lambda_{pump}$) is constant. Therefore, the N value can be determined if the pump light frequency $\omega_{pump}$ where the FWM efficiency becomes a maximum ("$\Delta\beta = 0$") is included in the range of the pump light frequency $\omega_{pump}$ to be measured, or even if such is not the case, if it is possible to predict the N value or the pump light frequency $\omega_{pump}$ where "$\Delta\beta = 0$" holds.

Figure 2:
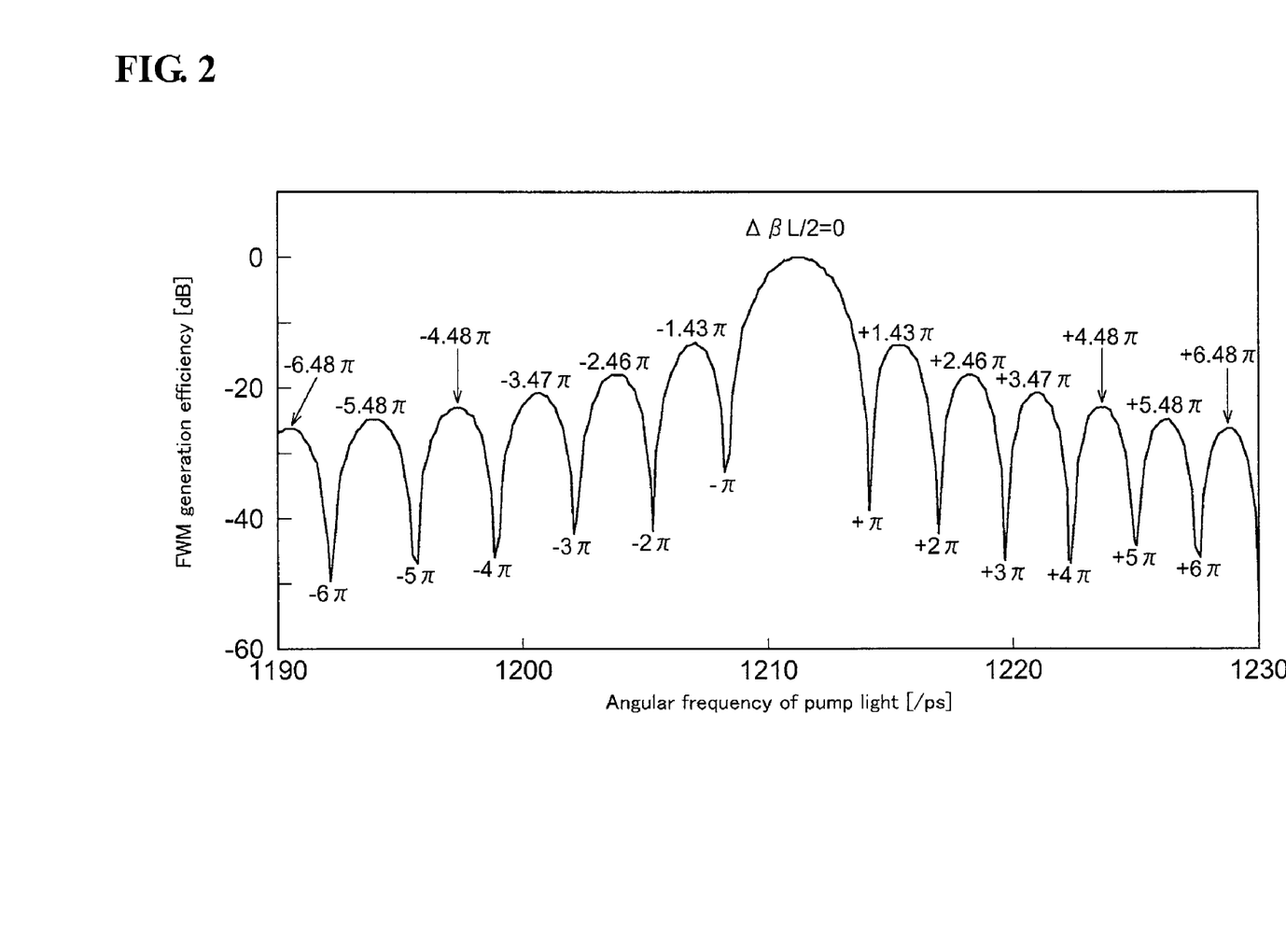
FIG. 2 is a graph showing the dependence of FWM generation efficiency on the angular frequency of pump light.

FIG. 2 is a graph showing the dependence of FWM generation efficiency on the angular frequency of pump light. If a graph is made by plotting the generation efficiency of idler light (Equation (7)) as ordinate while plotting the angular frequency of pump light as abscissa, the value of $\Delta\beta L/2$ at the pump light angular frequency where the FWM generation efficiency becomes maximal or minimal can be determined from Equations (16) and (17). Moreover, it is possible to calculate $\beta_3$, $\beta_4$ and zero-dispersion frequency $\omega_z$ from coefficients of a polynomial approximation of the graph in which the abscissa represents pump light frequencies $\omega_{pump}$ that make the maximum value and the minimal value or either of them and the ordinate represents phase mismatches $\Delta\beta$ that are calculated with Equations (16) and (17).

Also, when the pump light frequency is not near the zero-dispersion frequency, the relation between the phase mismatch $\Delta\beta$ and the pump light frequency $\omega_{pump}$ makes "$\Delta\beta/\Delta\omega^2 = -\beta_{2\_p}$" according to the relationship of Equation (20). In other words, it becomes possible to calculate $\beta_2$ at the $\omega_{pump}$. When the relation between $\beta_2$ and $\omega_{pump}$ is expressed in a graph, the x-axis intercept is the zero-dispersion frequency $\omega_z$. Also, it is possible to calculate $\beta_2, \beta_3, \ldots, \beta_{n+1}$ from the coefficients obtained by approximating the obtained plots with a polynomial function.

In the above explanation about the measurement of chromatic dispersion, the angular frequency $\omega$ is used. However, even if wavelength $\lambda$ is used, the N value can be determined if the relationship of "$\Delta\omega = 2\pi C \times (\lambda_{pump} - \lambda_{probe})/(\lambda_{pump} \times \lambda_{probe})$" is satisfied, and if "$\Delta\lambda = (\lambda_{pump} - \lambda_{probe})$" is substantively a constant value (the difference at the time of measurement is equal to or less than ±1%). In such case, it is possible to calculate the phase mismatch $\Delta\beta$ from the relationship of Equation (5), and also, by using the relations of Equations (1) to (4), it is possible to convert $\beta_n$ into the chromatic dispersion parameter "$d^{n-1}\beta_1/d\lambda^{n-1}$ (where $n \geq 2$)" which is generally used in the fiber optics.

Example 1

The measurement of chromatic dispersion was done using a chromatic dispersion measuring apparatus 1. The compositions of equipment included in the chromatic dispersion measuring apparatus 1 are as described below.

A wavelength tunable LD light source was used as the pump light source 10. The half width at half maximum of the pump light was 0.1 nm or less, and the wavelength $\lambda_{pump}$ was tuned in the range of 1525 nm to 1585 nm. Also, an EDFA was used as the amplifier 16, and the pump light was amplified to the range of +8 to +14 dBm. Here, an EDFA for the C-band was used when the wavelength $\lambda_{pump}$ of the pump light was in the range of 1525 to 1566 nm, and an EDFA for the L-band was used when the wavelength $\lambda_{pump}$ of the pump light was in the range of 1566 to 1585 nm.

As for the probe light source 11, a wavelength-tunable LD light source was used. The half width at half maximum of the probe light was kept at 0.1 nm or less while the wavelength $\lambda_{probe}$ of the probe light was tuned so that its difference from the wavelength $\lambda_{pump}$ of the pump light was kept at a constant value.

The polarization controllers 18 and 19 were arranged on the optical paths of the pump light and the probe light, respectively, and they adjusted so that the states of polarization of the pump light and the probe light which were incident on the DUT 13 (an optical fiber) were coincident. A 3-dB optical coupler was used as the optical coupler 12.

As to the measuring instrument 14, an optical spectrum analyzer (OSA) was used for measuring the intensities of the pump light, the probe light, and the idler light. The respective incident power of the pump light and the probe light which were incident on the optical fiber were calculated using the results of such measurement, the transmission loss of the optical fiber, and the optical coupling loss of the optical fiber and the OSA. The output power of the idler light was calculated on the basis of the optical coupling loss of the optical fiber and the OSA. Efficiencies for generating idler light were calculated with Equation (7), and the so-calculated efficiencies were changed into normalized values (normalized conversion efficiencies) relative to the maximum value of the efficiency.

Figure 3:
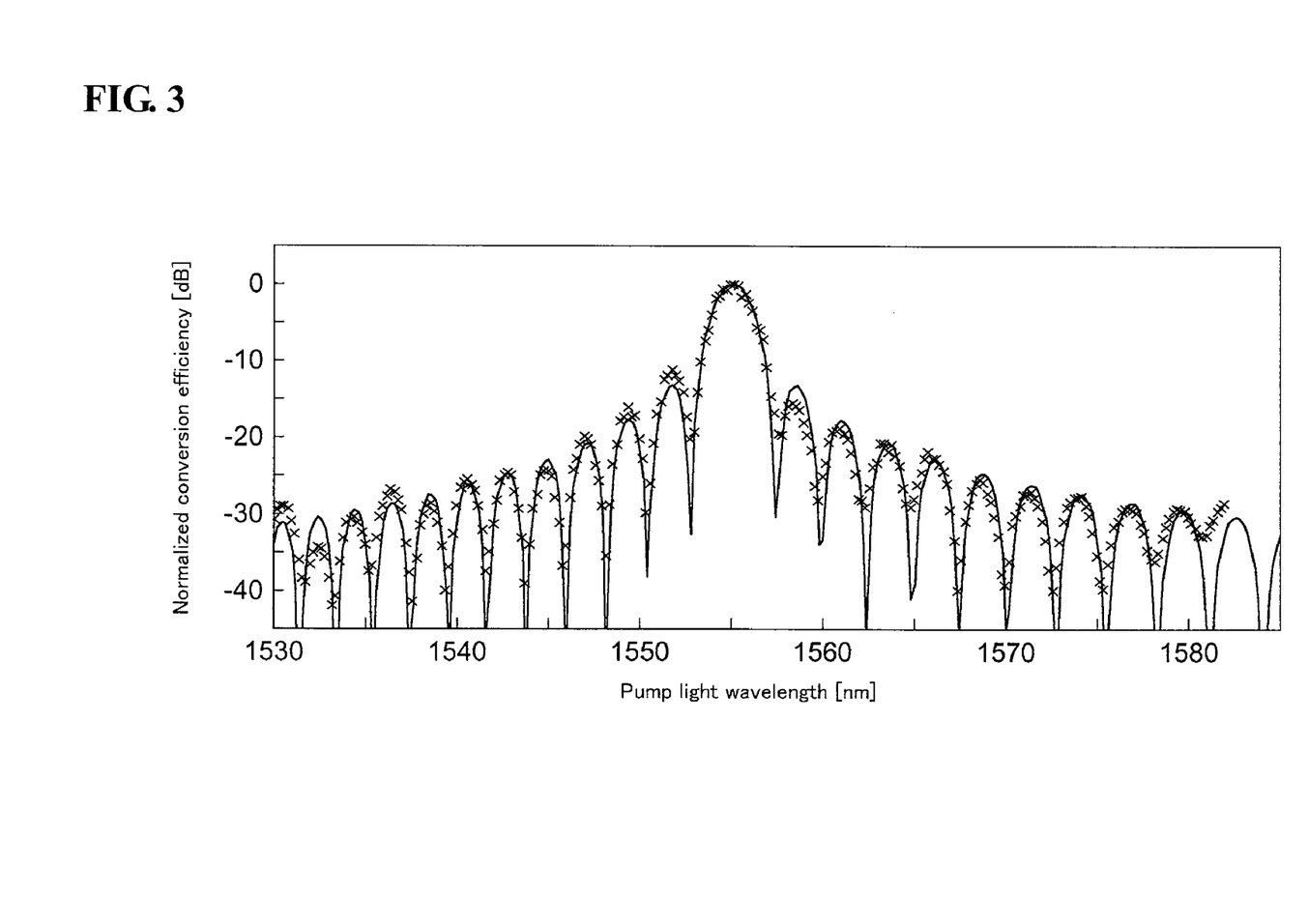
FIG. 3 is a graph plotting normalized conversion efficiencies of Optical fiber A with respect to pump light wavelengths.

FIG. 3 is a graph in which, the "x" mark plots the normalized conversion efficiencies in Optical fiber A (Table I) that is used as an inspection fiber 13 with respect to the pump light wavelength in the case of the wavelength being tuned while the wavelength difference between pump light and probe light is fixed at 25 nm.

TABLE I

| | Optical fiber | | | |
|---|---|---|---|---|
| | A | B | C | D |
| Transmission loss (dB/km) @1.55 μm | 0.85 | 1.1 | 0.89 | 0.60 |
| (1/km) | 0.20 | 0.25 | 0.25 | 0.14 |
| Aeff (μm²) | 8.9 | 9.4 | 8.5 | 11 |
| Polarization mode dispersion (ps/√km) | 0.02 | 0.1 | 0.05 | 0.1 |
| Cut-off wavelength (nm) | 1440 | 1600 | 1490 | 1650 |
| Length (m) | 255 | 250 | 250 | 16 |
| Nonlinear coefficient (1/w/km) | 28 | 25 | 30 | 19 |

(Note)
The nonlinear coefficient is a value in a linear polarization state.

Figure 4:
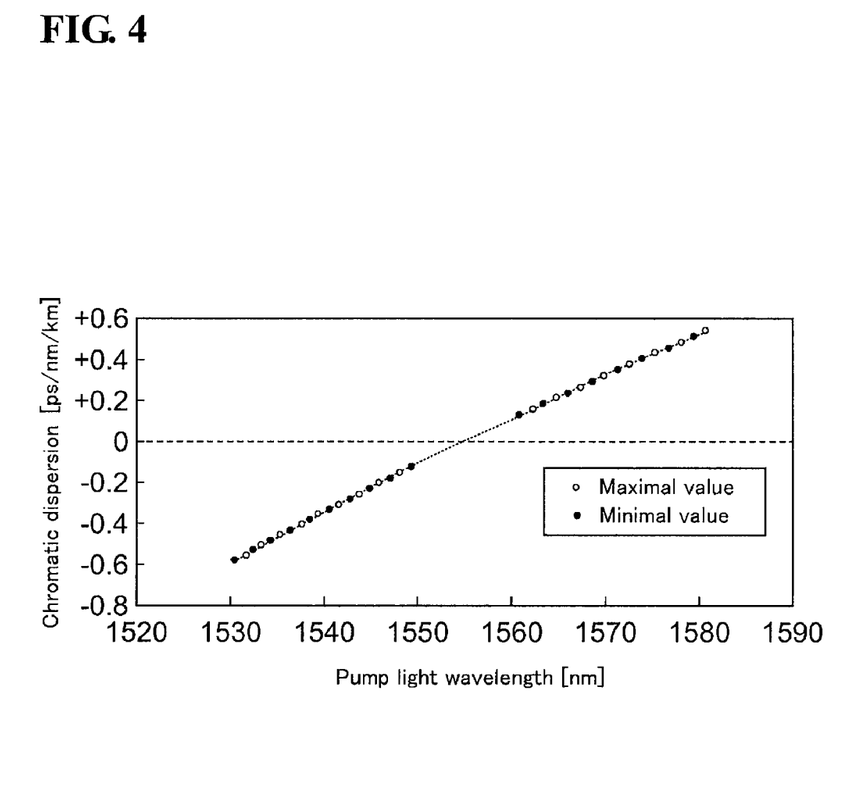
FIG. 4 is a graph showing the wavelength dependence of chromatic dispersion (Disp) of Optical fiber A as obtained by fixing the wavelength difference between the pump light and the probe light at 25 nm.

Moreover, the second-order dispersions $\beta_2$ were obtained from the pump light wavelengths which become a maximal value or a minimal value in the relations shown in FIG. 3 and the relations shown in Equations (16), (17), and (20), while the chromatic dispersions (Disp) were obtained from Equations (2) and (5). In such cases, maximal and minimal values in the wavelength range of 1555±5 nm were not used since $\beta_2$ was small and the relationship of Equation (20) does not hold true at the vicinities of the peak value (1555 nm wavelength). FIG. 4 is a graph showing the wavelength dependence of the chromatic dispersion (Disp) of Optical fiber A that was obtained by fixing the wavelength difference between the pump light and the probe light at 25 nm. In the graph, the ○ marks are points calculated from the minimal values of FIG. 3, and the ● marks are points calculated from the maximal values of FIG. 3. Furthermore, zero-dispersion wavelength $\lambda_0$, dispersion slope at the zero-dispersion wavelength, and wavelength differential value of the dispersion slope were calculated by using the coefficients of the cubic function fitted for the plotted points of FIG. 4 with the least squares method. The results are as shown in Table II.

TABLE II

| | Optical fiber | | |
|---|---|---|---|
| | A | B | C |
| Zero-dispersion wavelength $\lambda_0$ (nm) | 1555.1 | 1566.0 | 1556.9 |
| Dispersion slope at $\lambda_0$ (ps/nm²/km) | 0.0222 | 0.0233 | 0.0188 |
| dS/dλ at $\lambda_0$ (ps/nm³/km) | −0.00011 | −0.00097 | −0.00010 |
| d²(S)/dλ² (ps/nm⁴/km) | $1.4 \times 10^{-6}$ | $1.4 \times 10^{-6}$ | $8 \times 10^{-7}$ |
| Zero-dispersion frequency $\omega_Z$ (1/ps) | 1211.3 | 1211.3 | 1209.9 |
| $\beta_3$ at $\omega_Z$ (ps³/km) | 0.0366 | 0.0396 | 0.0312 |
| $\beta_4$ at $\omega_Z$ (ps⁴/km) | $5.2 \times 10^{-5}$ | $1.5 \times 10^{-5}$ | $6.5 \times 10^{-5}$ |
| $\beta_5$ (ps⁵/km) | $3 \times 10^{-6}$ | $3 \times 10^{-6}$ | $9 \times 10^{-7}$ |

The wavelength conversion efficiency was calculated on the basis of more accurate phase mismatch $\Delta\beta$ that was obtained according to Equation (22) using the above-described results. The results are shown by a solid line in FIG. 3. The measured values and the solid line of such calculation results are highly coincident. Thus, it was confirmed that the obtained chromatic dispersion characteristics were correct.

Figure 5:
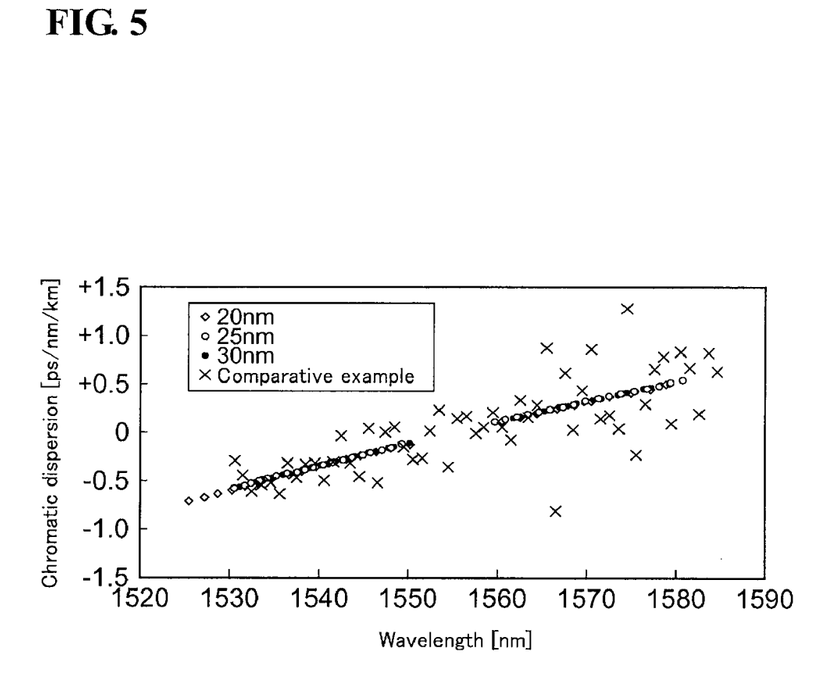
FIG. 5 is a graph in which the respective wavelength dependence of the chromatic dispersion (Disp) of Optical fiber A is shown altogether as obtained by fixing the wavelength difference between the pump light and the probe light at 20 nm, 25 nm, and 30 nm.

Furthermore, similar measurements were done with respect to Optical fiber A in the cases where the wavelength difference $\Delta\lambda$ between the pump light and the probe light was set to 20 nm and 30 nm. FIG. 5 is a graph showing the wavelength dependence of chromatic dispersions (Disp) of Optical fiber A for all the cases where the wavelength difference was fixed at 20 nm, 25 nm, and 30 nm. In addition, FIG. 5 shows, as a comparative example, the results of measurement obtained with a known modulated signal phase-shift method using Type 86037C from Agilent Technologies. In the chromatic dispersion measuring method relating to Example 1, the differences between the values obtained by the measurement and the fitted cubic curve obtained by a least squares method were extremely small: the maximum was 0.007 ps/nm/km. This is because the chromatic dispersion value Disp (or second order dispersion $\beta_2$) can be calculated using Equation (20) according to a physical principle, and the errors for determining the pump light wavelengths that make a maximal value and a minimal value were about ±0.2 nm (errors of about ±0.01% with respect to the 1550 nm wavelength), allowing a very accurate measurement.

Figure 6A:
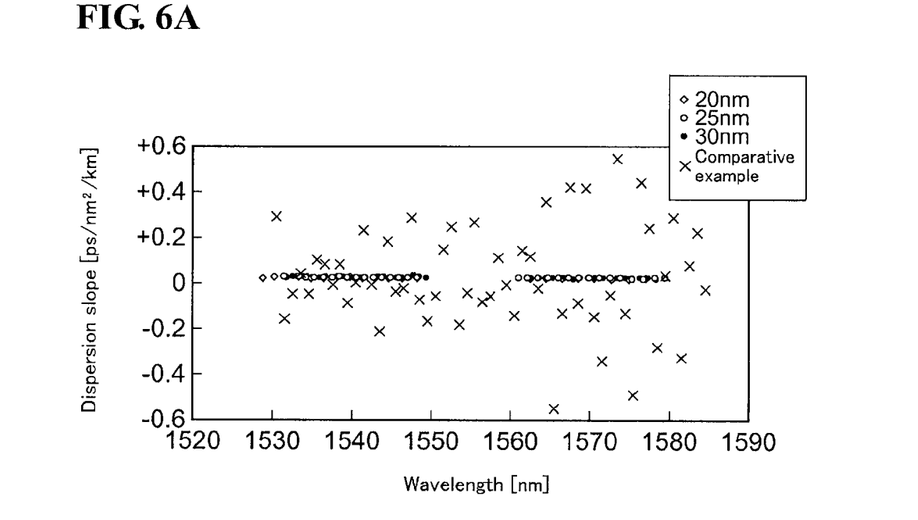
Figure 6B:
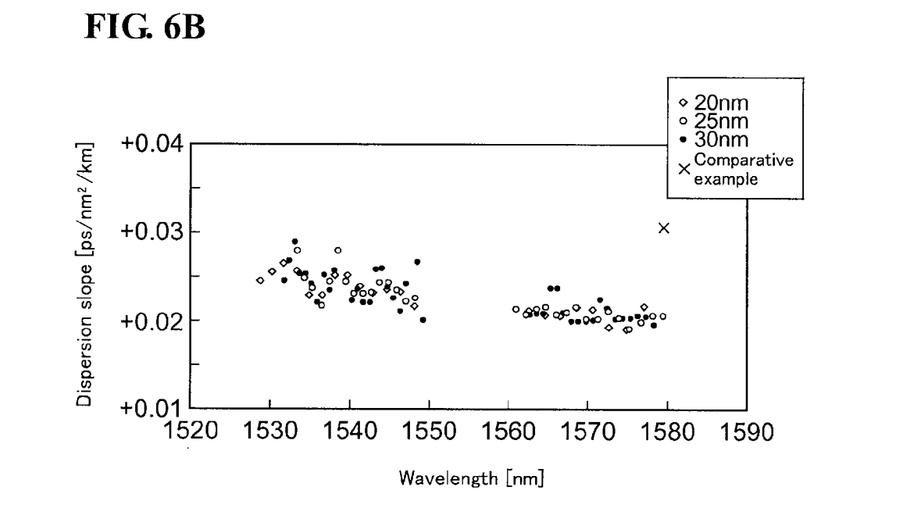

FIGS. 6A and 6B are graphs showing the wavelength dependence of the dispersion slope of Optical fiber A in the cases where the wavelength difference was fixed at 20 nm, 25 nm, and 30 nm: FIG. 6A is a graph showing the whole, and FIG. 6B is a close up graph showing a part. FIGS. 6A and 6B also show, as a comparative example, the results of measurement by the modulated signal phase-shift method. It was confirmed that according to Example 1, the measurement for dispersion slope that was more accurate by 2 digits (distribution: in the range of 0.024±0.005 ps/nm²/km) than the modulated phase method (distribution: −0.55 to +0.55 ps/nm²/km) could be performed.

Furthermore, similar measurements like Optical fiber A were done with respect to Optical fiber B and Optical fiber C. The results are shown in Table II, also.

Figure 7:
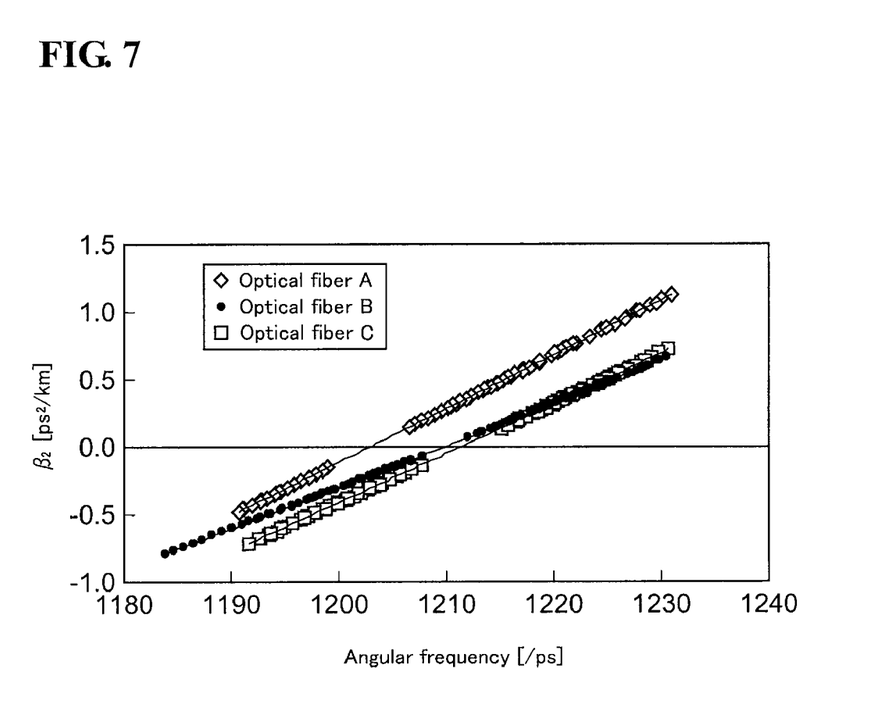
FIG. 7 is a graph showing an angular frequency spectrum of $\beta_2$ with respect to each of optical fibers A, B, and C.

FIG. 7 is a graph showing an angular frequency spectrum of $\beta_2$ with respect to each of Optical fibers A, B, and C. With respect to all of Optical fibers A, B, and C, the errors from the fitted curve shown by the solid line approximated by a third-order function were small, and it was confirmed that the accurate measurement can be implemented.

Example 2

Figure 8:
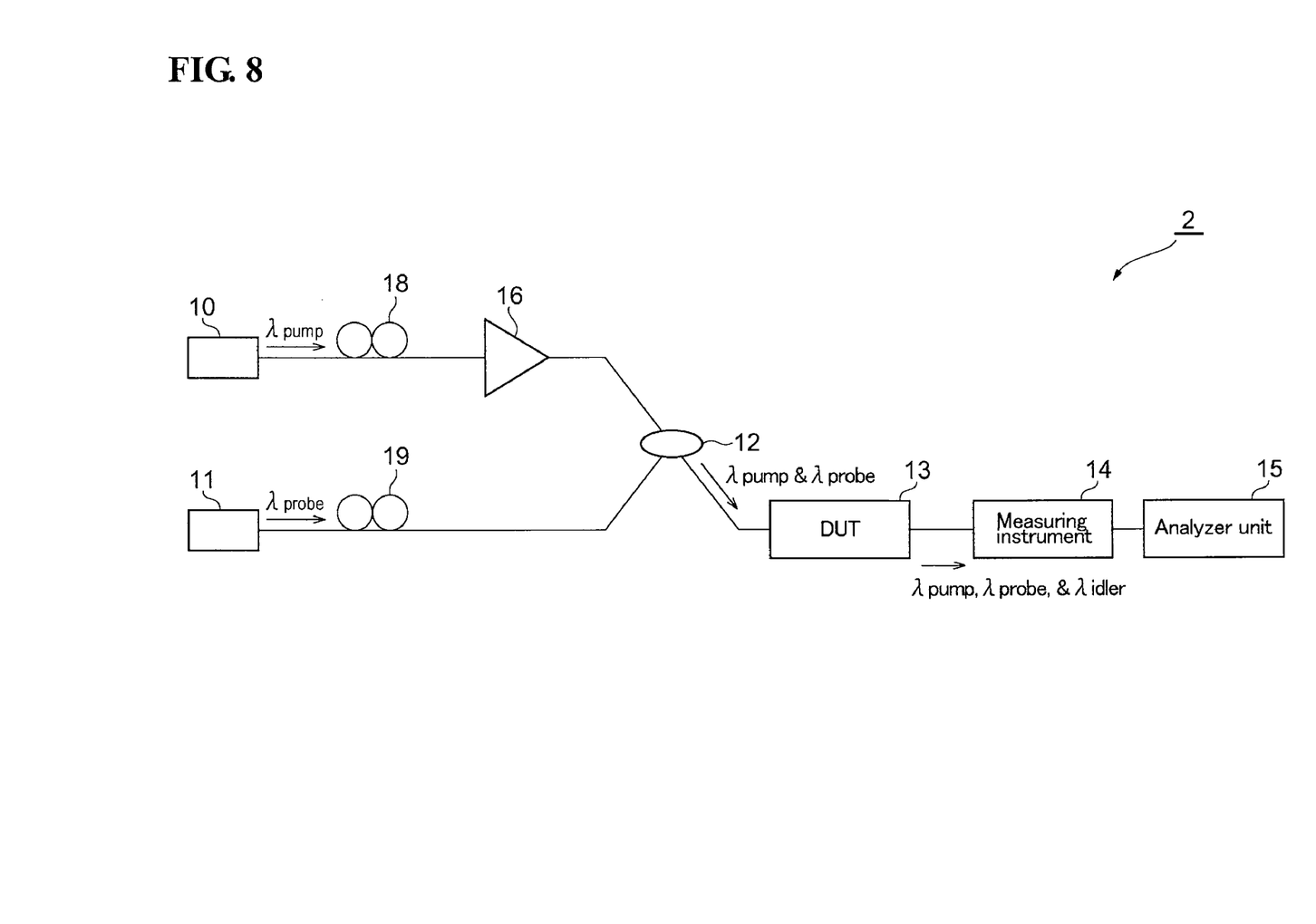
FIG. 8 is a conceptional schematic diagram of a chromatic dispersion measuring apparatus relating to another embodiment of the present invention.

FIG. 8 is a conceptional schematic diagram of a chromatic dispersion measuring apparatus 2 relating to another embodiment of the present invention. In the chromatic dispersion measuring apparatus 2, the arrangement of the amplifier 16 and the polarization controller 18 is reversed as compared with the chromatic dispersion measuring apparatus 1. That is, the structure is such that the pump light emitted from the pump light source 10 is amplified by the amplifier 16 after the states of polarization thereof are aligned with each other by the polarization controller 18.

A wavelength-tunable LD light source was used as the pump light source 10 and the probe light source 11. In such case, the half width at half maximum was 0.1 nm or less. The wavelength $\lambda_{pump}$ of the pump light was tuned in the range of 1530 nm to 1600 nm in a state in which the difference between the wavelength $\lambda_{pump}$ and the wavelength $\lambda_{probe}$ of the probe light were kept 52 nm or 65 nm. The states of polarization of these pump light and probe light are aligned with each other by the polarization controllers 18 and 19 so that the FWM generation efficiency would be maximum.

The pump light was amplified to the range of +12 to +16 dBm using an EDFA as the amplifier 16. In such case, an EDFA for C-band was used when the wavelength $\lambda_{pump}$ of the pump light was 1530 to 1566 nm, and an EDFA for L-band was used when the wavelength $\lambda_{pump}$ of the pump light was 1566 to 1600 nm. On the other hand, the probe light was set to exhibit an intensity of −6 to 0 dBm at the input end of an optical fiber as the DUT 13. Also, a 3-dB optical coupler was used as the optical coupler 12.

The intensities of the pump light, the probe light, and the idler light were measured using an optical spectrum analyzer (OSA) as the measuring instrument 14. Also, using the results of these measurements, the transmission loss of the optical fiber, and the optical coupling loss regarding the optical fiber and the OSA, the respective incident power onto the optical fiber was calculated with respect to the pump light and the probe light. Also, the output power of the idler light was calculated on the basis of the coupling loss regarding the optical fiber and the OSA. The efficiencies of generating the idler light were obtained using Equation (7), and the so-obtained efficiencies were changed into a normalized value (normalized conversion efficiencies) relative to the conversion efficiency which the efficiency of the idler light generation becomes the maximum value.

Figure 9:
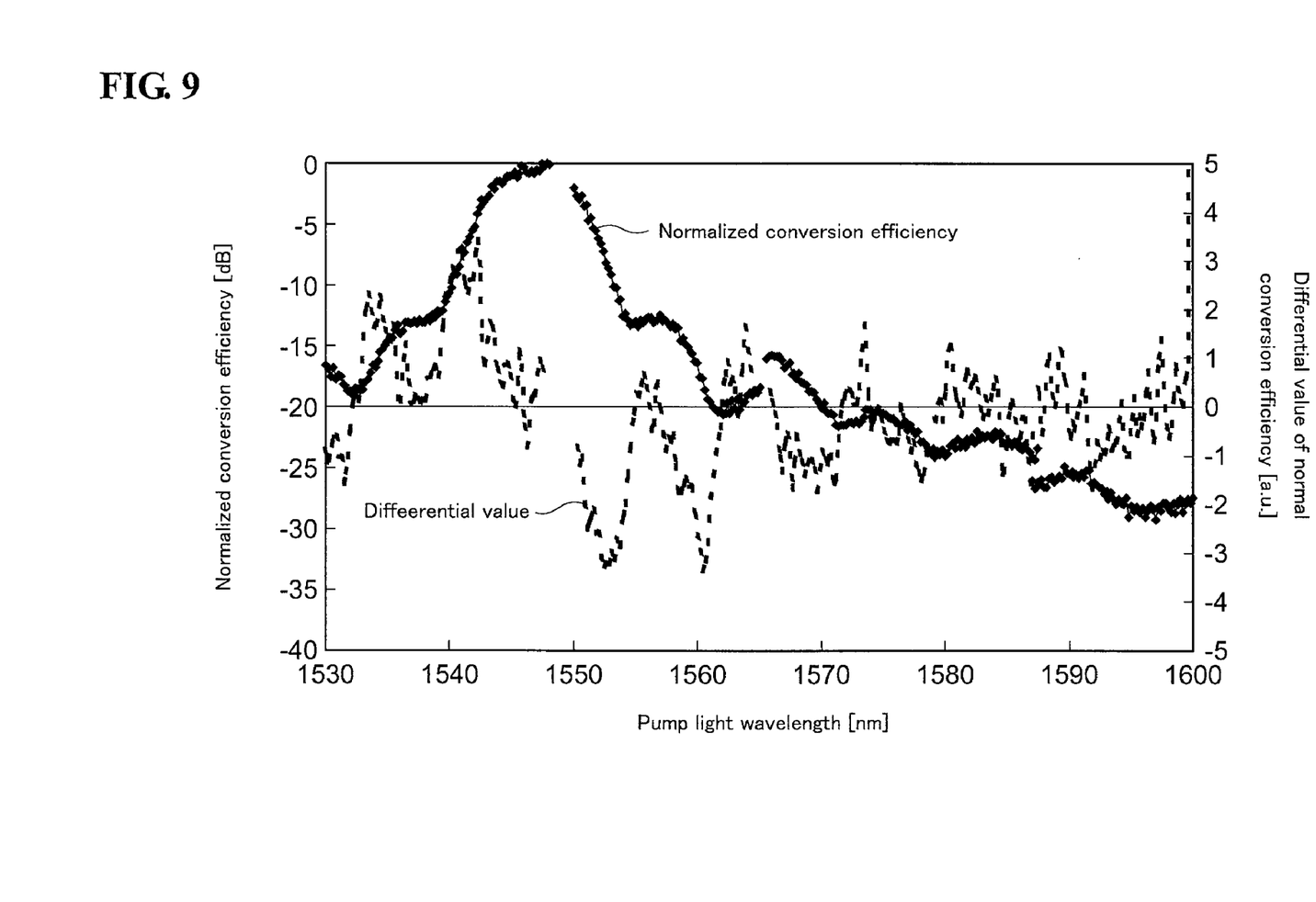
FIG. 9 is a graph plotting the normalized conversion efficiencies of Optical fiber D and the differential values thereof with respect to the pump light wavelengths.

FIG. 9 is a graph plotting the normalized conversion efficiencies and the differential values thereof with respect to the pump light wavelengths in the case where the wavelength was tuned while the wavelength difference between the pump light and the probe light was fixed at 52 nm in Optical fiber D that is used as tested fiber 13. (The characteristics of Optical fiber D are summarized in Table 1.) Since Optical fiber D has a shorter fiber length of 16 m and lower conversion efficiency than Optical fiber A, it is difficult to identify a maximal value and a minimal value as compared with the results (FIG. 3) shown in Example 1. Therefore, the maximal value and the minimal value were found from the differentiation of the conversion efficiency with respect to wavelength (i.e., the differentiation was obtained such that the conversion efficiency for a continuous 0.5 nm portion of measurement pump light wavelength was approximated using quadratic function and the approximated value was differentiated with respect to wavelength).

Figure 10:
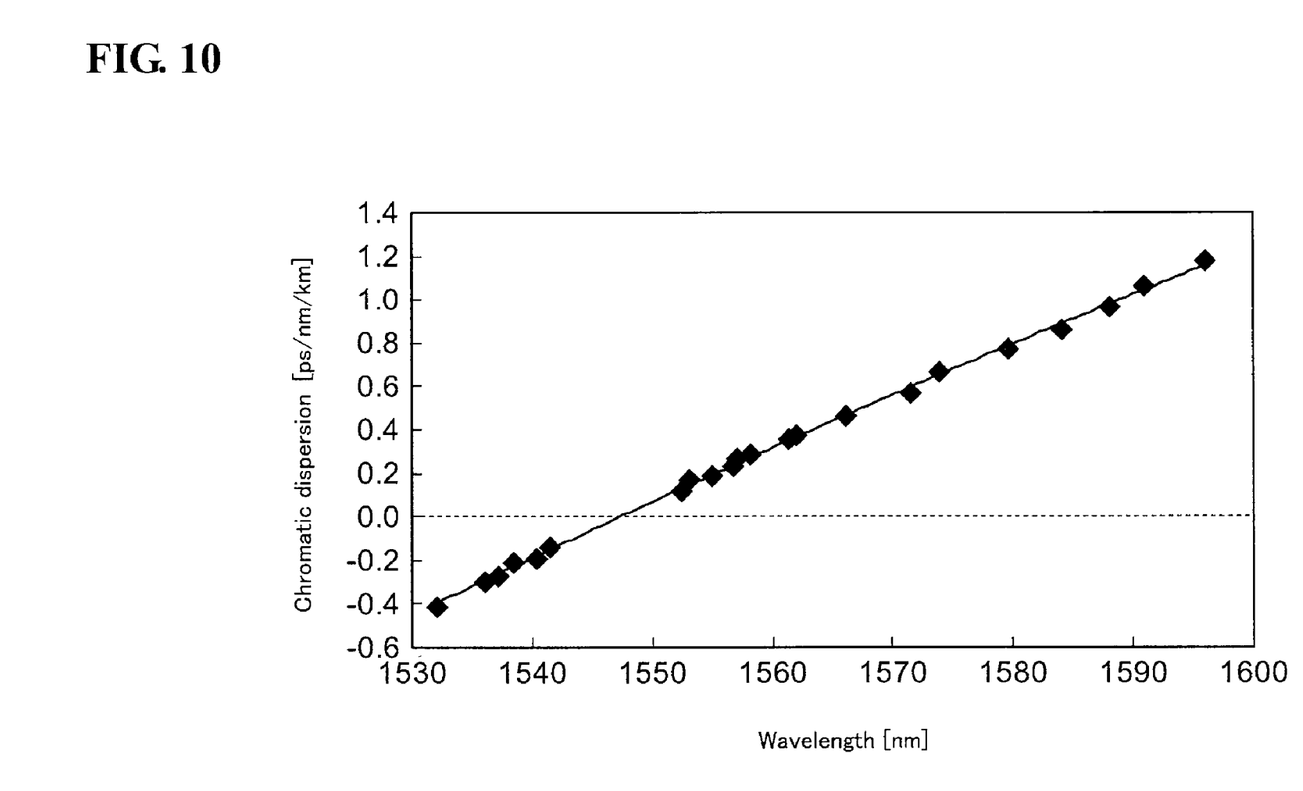
FIG. 10 is a graph showing the wavelength dependence of the chromatic dispersion (Disp) of Optical fiber D.

Subsequently, $\beta_2$ was calculated from the pump light wavelengths that make maximal values and minimal values and the relations of Equations (16), (17), and (20), and moreover the chromatic dispersion (Disp) was obtained from Equations (2) and (5). FIG. 10 is a graph showing the wavelength dependence of the chromatic dispersion (Disp) of Optical fiber D. In FIG. 10, the curve is a fitted curve obtained by approximation with a quadratic function using the least squares method. The difference between the fitted curve and the calculation values was 0.031 ps/nm/km at maximum. The difference between the fitted curve and the dispersion values obtained for the entire length of the measurement fiber was 0.0004 ps/nm at maximum, which was extremely small in view of the fiber length of Optical fiber D, i.e., 16 m.

As in the cases of Fibers A, B, and C, high-order dispersions were determined for Optical fiber D. The results are shown in Table III.

TABLE III

| Optical fiber | D |
| --- | --- |
| Zero-dispersion wavelength $\lambda_0$ (nm) | 1547.3 |
| Slope at $\lambda_0$ (ps/nm$^2$/km) | 0.027 |
| dS/dλ at $\lambda_0$ (ps/nm$^3$/km) | −0.000073 |
| Zero-dispersion frequency $\omega_Z$ | 1217.4/ps |
| $\beta_3$ at $\omega_Z$ (ps$^3$/km) | 0.0044 |
| $\beta_4$ at $\omega_Z$ (ps$^4$/km) | 6.1 × 10$^{-5}$ |

According to the chromatic dispersion measuring method of the present invention, it is possible to measure the chromatic dispersion of an optical fiber having the decreased fiber length of ½, because the same output power $P_{idler}$ of the idler light can be obtained by increasing the power of the pump light by two-fold (3 dB). For example, if the pump light intensity is increased, it is possible to measure the chromatic dispersion of an optical fiber having a fiber length of 10 m or less (e.g., several meters), and the chromatic dispersion of a dispersion shifted fiber having a length of several meters to hundreds of meters can be measured with a extremely high precision.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

For example, a multi-wavelengths light sources such as a wideband light source may be used as the pump light source 10 and the probe light source 11, instead of a wavelength tunable light source. In such case, a light source having a substantively single wavelength (the half width at half maximum: about 0.2 nm or less) is preferable for either one of the pump light source and the probe light source. The phase mismatch Δβ may be calculated relative to the corresponding pump light wavelength by changing a light source having a narrow line width and choosing a frequency of the idler light so that Δω (or Δλ) may become constant.

Here, in the case of a substantially single pump-light wavelength, for example, it is preferable to change the pump light wavelength. In that case, it is unnecessary to change the probe light wavelength. Also, it is possible to measure by changing the pump light wavelength in an optional range. In such case, it is possible to measure the chromatic dispersion by measuring the output light intensity of the idler light and plotting the generation efficiency shown in Equation (19) relative to the pump light. In this case, it is possible to reduce the time required for measurement because the chromatic dispersion can be measured by making only the pump light source 10 a wavelength tunable light source. In addition, it is possible to reduce the cost for making the chromatic dispersion measuring apparatus.

Also, when the probe light wavelength is substantively a single wavelength, it is possible to conduct measurement by altering the probe light wavelength. In such case, it is only the probe light wavelength that must be tunable, and preferably, the probe light wavelength is changed to the extent that it does not overlap with the pump light wavelength. In that case, the chromatic dispersion can be measured by measuring the output light intensity of the idler light and plotting the generation efficiency shown in Equation (19) relative to the probe light.

Also, the wavelength range of the pump light emitted from the pump light source 10 is not necessarily a 1.55 µm band and may be an arbitrary wavelength band. Particularly, it is preferable to change the wavelength $\lambda_{pump}$ of the pump light in the range including the zero-dispersion wavelength of the DUT 13. By so changing in the range including the zero-dispersion wavelength, the chromatic dispersion can be measured in higher precision.

Even if the wavelength range of the pump light to be measured does not include the zero-dispersion wavelength of the DUT 13, it is sufficient if the phase mismatch $\Delta\beta$ that is shown with Equations (16) and (17) at the maximal value or the minimal value can be determined. In other words, if the zero-dispersion wavelength can be estimated and the N value of Equations (16) and (18) can be determined, it is possible to calculate the chromatic dispersion by means of the analysis shown in the present embodiment. Particularly, it is preferable to change the wavelength $\lambda_{pump}$ of the pump light in the range including the pump light wavelength with which the generation efficiency of the idler light becomes minimal in the vicinity of the main peak. By doing so, the chromatic dispersion can be measured at higher precision.

Also, by designing the pump light and the probe light to be pulsed light in the above-described embodiment, the dispersion value at a specific position of the optical fiber can be found. In this case, the position at which the pump light and the probe light collide with each other is controlled by adjusting the difference in the timing for each of the pump light and the probe light being incident on a different end face of the optical fiber so as to propagate. The analysis tool can calculate the chromatic dispersion characteristics at the colliding position of the fiber by obtaining, in a similar manner as described above, the pump light wavelength dependence of the idler light that is generated as a result of correlation of the pump light and the probe light at the specific position of the optical fiber.

In the above-mentioned case, it is advantageous to narrow the pulse width of the pump light and the probe light, for example, since it enables high positional resolution. On the other hand, since the conversion efficiency of the idler light in Equation (7) becomes lower and the phase mismatch parameter $\Delta\beta$ in Equation (11) decreases, it is necessary to increase the wavelength difference between the pump light and the probe light according to Equations (16) and equation (17). On the other hand, if the pulse width of the pump light and the probe light is broadened, the correlation distance of the pump light and the probe light becomes longer, resulting in higher conversion efficiency of the idler light, and accordingly the wavelength difference between the pump light and the probe light may be smaller. However, the positional resolution becomes lower. Therefore, it is preferable to choose the pulse width of the pump light and the probe light appropriately depending on the measurement conditions.

For example, when the pulse width is 0.5 ns, the correlation distance of the pump light and the probe light is about 0.1 m. Similarly, when the pulse width is 5 ns, the correlation distance is about 1 m. When the pulse width is 500 ns, the correlation distance is about 100 m, and when the pulse width is 1000 ns, the correlation distance is about 200 m. If the DUT 13 is an optical fiber, it is preferable to set the pulse width in the range of 0.5 to 1000 ns.

In the above-mentioned method for measuring chromatic dispersion, the zero-dispersion of the optical fiber should be uniform. However, the length of the optical fiber for which high precision measurement of the zero-dispersion wavelength or high-order dispersion is demanded is as short as 1 km or less, and therefore it is not very difficult to obtain a uniform zero-dispersion wavelength (for example, distribution of ±5 nm or less). That is, the method of measuring the chromatic dispersion according to the above embodiment can be suitably used for an optical fiber having a length of several meters to about 1 km.

The lower the polarization mode dispersion (PMD) of the DUT 13, the more desirable; however, when the DUT 13 is an optical fiber, it is possible to make the accurate measurement if PMD is 0.5 ps or less for the full length of the fiber. As for the cutoff wavelength, the conventional method has required single mode propagation in the measurement wavelength; however, in the method of this embodiment, the higher mode in which the zero-dispersion wavelength is not in the vicinity of the measurement range does not satisfy the relationship of Equation (19), and therefore it does not become a noise factor. In fact, it was possible to measure the chromatic dispersion at the wavelength of about 1600 nm or shorter with respect to Optical fiber B having a long cutoff wavelength of 1600 nm. Since the nonlinear phenomenon is used, the higher the nonlinear coefficient of the fiber, the measurement is easier. However, even if the nonlinear coefficient is low, the measurement can be accomplished by increasing the pump light intensity. For example, it is also possible to measure the chromatic dispersion of a transmission dispersion-shifted fiber having a nonlinear coefficient γ of 2/W/km.

What is claimed is:

1. A chromatic dispersion measuring apparatus comprising:
    a pump light source for emitting pump light with a wavelength $\lambda_{pump}$, the wavelength $\lambda_{pump}$ being tuned;
    a probe light source for emitting probe light with a wavelength $\lambda_{probe}$, the wavelength $\lambda_{probe}$ being tuned under the condition where the wavelength $\lambda_{probe}$ is apart from the wavelength $\lambda_{pump}$ by a given wavelength or a given frequency;
    a measuring means for measuring the power of idler light having a wavelength $\lambda_{idler}$ output from a device under test according to four-wave mixing generated by propagation of the pump light and the probe light through the device; and
    an analysis tool for calculating the chromatic dispersion of the device by detecting pump light wavelengths for making a generation efficiency of the idler light local extreme values in the relationship between the pump light wavelength and the generation efficiency of the idler light, and then by calculating phase mismatch among such detected pump light wavelengths, the corresponding probe light wavelengths, and the corresponding idler light wavelengths.

2. A chromatic dispersion measuring apparatus according to claim 1, wherein
    the device is an optical fiber,
    the pump light and the probe light are pulse light, and
    the analysis tool calculates the chromatic dispersion at a specific position of the optical fiber by measuring the power of the idler light, the idler light being generated as a result of correlation between the pump light and the probe light, the correlation occurring at the specific position of the optical fiber when each of the pump light and the probe light is input to a different end of the optical fiber.

3. A chromatic dispersion measuring method for calculating the chromatic dispersion of a device under test, comprising:
propagating pump light having a wavelength $\lambda_{pump}$ and probe light having a wavelength $\lambda_{probe}$ through a device under test, the wavelengths $\lambda_{pump}$ and $\lambda_{probe}$ being tuned under the condition where the wavelength $\lambda_{probe}$ is apart from the wavelength $\lambda_{pump}$ by a given wavelength or a given frequency;
seeking a generation efficiency of the idler light as a function of the pump light wavelength $\lambda_{pump}$ by measuring the power of idler light having a wavelength $\lambda_{idler}$ output from the device according to four-wave mixing generated in the device;
seeking pump light wavelengths for making the generation efficiency of the idler light local extreme values in the relationship between the generation efficiency and the wavelength $\lambda_{pump}$; and
calculating the chromatic dispersion of the device from the result of calculation of phase mismatch among the pump light wavelength having such wavelengths, the corresponding probe light wavelength, and the corresponding the idler light wavelength.

4. A chromatic dispersion measuring method according to claim 3, further comprising tuning the wavelength $\lambda_{pump}$ of the pump light in the range including the zero-dispersion wavelength of the device.

5. A chromatic dispersion measuring method according to claim 3, further comprising tuning the wavelength $\lambda_{pump}$ of the pump light in the range including the pump light wavelength for making the generation efficiency of the idler light minimal in the vicinity of a main peak.

6. A chromatic dispersion measuring method according to claim 3, further comprising seeking the zero-dispersion wavelength of the device.

7. A chromatic dispersion measuring method according to claim 3, further comprising calculating the dispersion slope of the device in the wavelength $\lambda_{pump}$.

8. A chromatic dispersion measuring method according to any one of claims 3 to 7, further comprising calculating the wavelength differential value of the dispersion slope of the device in the wavelength $\lambda_{pump}$.

* * * * *